(12) United States Patent
Ernst

(10) Patent No.: US 7,253,386 B2
(45) Date of Patent: Aug. 7, 2007

(54) METHOD AND APPARATUS FOR MONITORING AND CONTROLLING LASER INTENSITY IN A ROS SCANNING SYSTEM

(75) Inventor: Steven L. Ernst, Torrance, CA (US)

(73) Assignee: Xerox Corporation, Stamford, CT (US)

( * ) Notice: Subject to any disclaimer, the term of this patent is extended or adjusted under 35 U.S.C. 154(b) by 8 days.

(21) Appl. No.: 11/299,808

(22) Filed: Dec. 12, 2005

(65) Prior Publication Data

US 2007/0131842 A1    Jun. 14, 2007

(51) Int. Cl.
*G01J 1/32*    (2006.01)
(52) U.S. Cl. .................... 250/205; 250/214 R
(58) Field of Classification Search .......... 250/205, 250/235, 214 R, 237 R, 201.1; 347/236, 347/246
See application file for complete search history.

(56) References Cited

U.S. PATENT DOCUMENTS

| | | | |
|---|---|---|---|
| 4,689,482 A * | 8/1987 | Horikawa et al. .......... 250/205 |
| 5,475,701 A | 12/1995 | Hibbs-Brenner | |
| 5,543,611 A | 8/1996 | Andrews | |
| 5,600,126 A | 2/1997 | Appel et al. | |
| 5,606,572 A | 2/1997 | Swirhun et al. | |
| 5,659,414 A | 8/1997 | Appel et al. | |
| 5,784,396 A | 7/1998 | Guerin | |
| 5,801,402 A | 9/1998 | Shin | |
| 5,812,582 A | 9/1998 | Gilliland et al. | |
| 5,881,084 A | 3/1999 | Huang et al. | |
| 5,993,075 A | 11/1999 | Huang et al. | |
| 6,069,905 A | 5/2000 | Davis et al. | |
| 6,359,641 B1 | 3/2002 | Nacman et al. | |
| 6,678,292 B2 | 1/2004 | Wickstrom et al. | |
| 6,898,219 B2 | 5/2005 | Malone et al. | |

* cited by examiner

*Primary Examiner*—Que T. Le
(74) *Attorney, Agent, or Firm*—Fay Sharpe LLP

(57) ABSTRACT

A laser intensity monitoring and control apparatus and method. One or more laser diodes emit laser light at an intensity depending upon a supplied drive current. A collimating lens collimates the emitted laser light. An aperture clips portions of the collimated laser light striking the aperture outside the predetermined beam contour and reflects part or all of the clipped portion of the collimated laser light to a focusing lens. A monitoring detector senses the focused laser light and generates an electrical signal depending on the intensity of the focused laser light, wherein a feedback circuit monitors the electrical signal and adjusts the drive current of the laser diode as necessary to maintain a predetermined laser light intensity. A ROS scanner optics system receives and images the beam contour.

21 Claims, 3 Drawing Sheets

METHOD AND APPARATUS FOR MONITORING AND CONTROLLING LASER INTENSITY IN A ROS SCANNING SYSTEM

BACKGROUND

The present application relates generally to the monitoring of output power from a semiconductor laser diode, and more particularly to the monitoring of output power from a vertical cavity surfacing emitting laser (VCSEL) as used in a raster output scanning (ROS) system.

It is well known in the scanning art to use laser diodes to generate a coherent laser beam which is then optically shaped for use as a scanning beam in a ROS system. It is also known to use multiple laser diodes to create multiple beams with each individual beam being independently modulated by video signals and scanned onto the recording or image surface as modulated beams. For these multiple beam applications, it has been found advantageous to use the rays with closely spaced laser diodes. Typically, the laser diodes in a multiple beam system are individually addressable. Individually addressable diodes require that each diode have a separate current source that drives or modulates the diodes. In operation, each driver sends a current through the diodes sufficient to induce emission of laser light, and the amount of current the driver produces is determined, in part, by the physical input data driving the particular lasing element. Because different laser diodes have different types of power characteristics in response to a given driving current, it is also desirable to monitor the amount of output power from each laser diode individually.

In systems utilizing diodes having a front (main) facet and a back facet, it may be possible to monitor light escaping from the back facet of the diode. This approach makes it possible to monitor the light output of the diode without interfering or disturbing the useful light being emitted out of the front facet of the diode. An example of a method and apparatus for controlling the power output of multiple laser diodes utilizing radiation from the back facet is disclosed in U.S. Pat. No. 5,600,126, the disclosure of which is incorporated herein by reference in its entirety. Typically, however, back facet monitoring is accomplished using an internal photodiode rather than an external photodiode as disclosed in this patent.

However, many systems now use a VCSEL diode or an array of VCSEL diodes. These diodes do not emit light from a back facet, but rather only emit light from one surface or facet of the diode. Therefore, it is not possible to take advantage of light being emitted from a back facet. Typically, the VCSEL diode laser output is diverging and, therefore, requires the use of a collimating lens. The beam is then sent through an aperture for shaping, and is imaged by scanner optics. One option to monitor and control the output from a VCSEL diode is to place a beam splitter directly in the beam path and reflect a portion of the beam back onto a photodiode used for measuring and monitoring the VCSEL diode output. An example of a ROS system which reflects a portion of the collimated light outputs to impinge on one or two photodiodes configured to monitor and control the output of the VCSEL diodes is disclosed in U.S. Pat. No. 5,659,414, the disclosure of which is incorporated herein by reference in its entirety.

FIG. 5 shows one embodiment of a prior art ROS system which reflects a portion of a collimated beam for purposes of controlling VCSEL diodes. In this embodiment, an array 10 is comprised of laser diodes 12, 14. Two photodiodes 16, 18 are mounted on a front face of a heat sink 20 for sensing light impinging on the photodiodes. Output beams 22, 24 are collimated by a collimating lens 26. Positioned between the collimating lens 26 and a ROS optical system (not shown) is a partially reflecting beam splitter mirror 28. The mirror 28 is tilted at an appropriate angle to reflect part of the collimated beam back through the collimating lens 26 so as to reimage a portion of the light from the laser diodes 12, 14 onto the photodiodes 16, 18. Signals from the photodiodes 16, 18, which vary according to the intensity of the reflected light, are coupled to a feedback circuit 30, used to control the output of laser diodes 12, 14, thereby maintaining the output intensity at a predetermined level.

An aspect of the prior art embodiment is that the arrangement collects an appreciable fraction of the emitted light from laser diodes 12, 14 which could otherwise be beneficially used by the ROS scanning optic system. Also a large two-dimensional diode laser array and its associated integrated circuit chip restrict or prohibit the placement of photodiodes in close proximity in order to be able to collect sufficient back-reflected light as depicted in FIG. 5.

BRIEF DESCRIPTION

According to aspects illustrated herein, there is provided a laser intensity monitoring and control apparatus including one or more laser diodes emitting laser light at an intensity that depends upon a drive current. An aperture shapes the emitted laser light to a predetermined beam contour, thereby clipping portions of the laser light striking the aperture outside the predetermined beam contour. A monitoring detector senses a reflected portion of the clipped laser light, the aperture reflecting the reflected portion in the direction of the monitoring detector. The monitoring detector generates an electrical signal depending on the intensity of the reflected portion of the clipped laser light, and a feedback circuit monitors the electrical signal. The feedback circuit also adjusts the drive current of the laser diode as necessary to maintain a predetermined laser light intensity.

According to aspects illustrated herein, there is also provided a raster output scanning system having one or more laser diodes emitting laser light at an intensity that depends upon a drive current. A collimating lens collimates the emitted laser light before an aperture shapes the collimated laser light to a predetermined beam contour. This aperture or another aperture clips portions of the collimated laser light striking the aperture outside the predetermined beam contour and reflects part or all of the clipped portion of the collimated laser light to a focusing lens. A monitoring detector senses the focused laser light and generates an electrical signal depending on the intensity of the focused laser light, wherein a feedback circuit monitors the electrical signal and adjusts the drive current of the laser diode as necessary to maintain a predetermined laser light intensity. A ROS scanner optics system receives and images the beam.

According to aspects illustrated herein, there is further provided a method for monitoring and controlling laser intensity in a ROS scanning system. Laser light is emitted from at least one laser diode at an intensity that depends upon a drive current supplied to the laser diode. The emitted laser light is shaped with an aperture to a predetermined beam contour, the aperture clipping portions of the laser light striking the aperture outside the predetermined beam contour. A reflected portion of the clipped laser light is sensed with a monitoring detector, and the monitoring detector generates an electrical signal depending on the intensity of the reflected portion of the clipped laser light. The drive current of each laser diode is adjusted based on the generated electrical signal received by a feedback circuit to maintain a predetermined laser light intensity.

One advantage of the present application is that none of the useful portion of the light beam is sacrificed for monitoring purpose. This effectively enables all useful portions of the light beam to be used by the ROS scanning system.

Another advantage of the present application is that the number of sources of error in the control system is reduced, thereby minimizing the power variability between multiple laser diodes.

DETAILED DESCRIPTION

Figure 1:
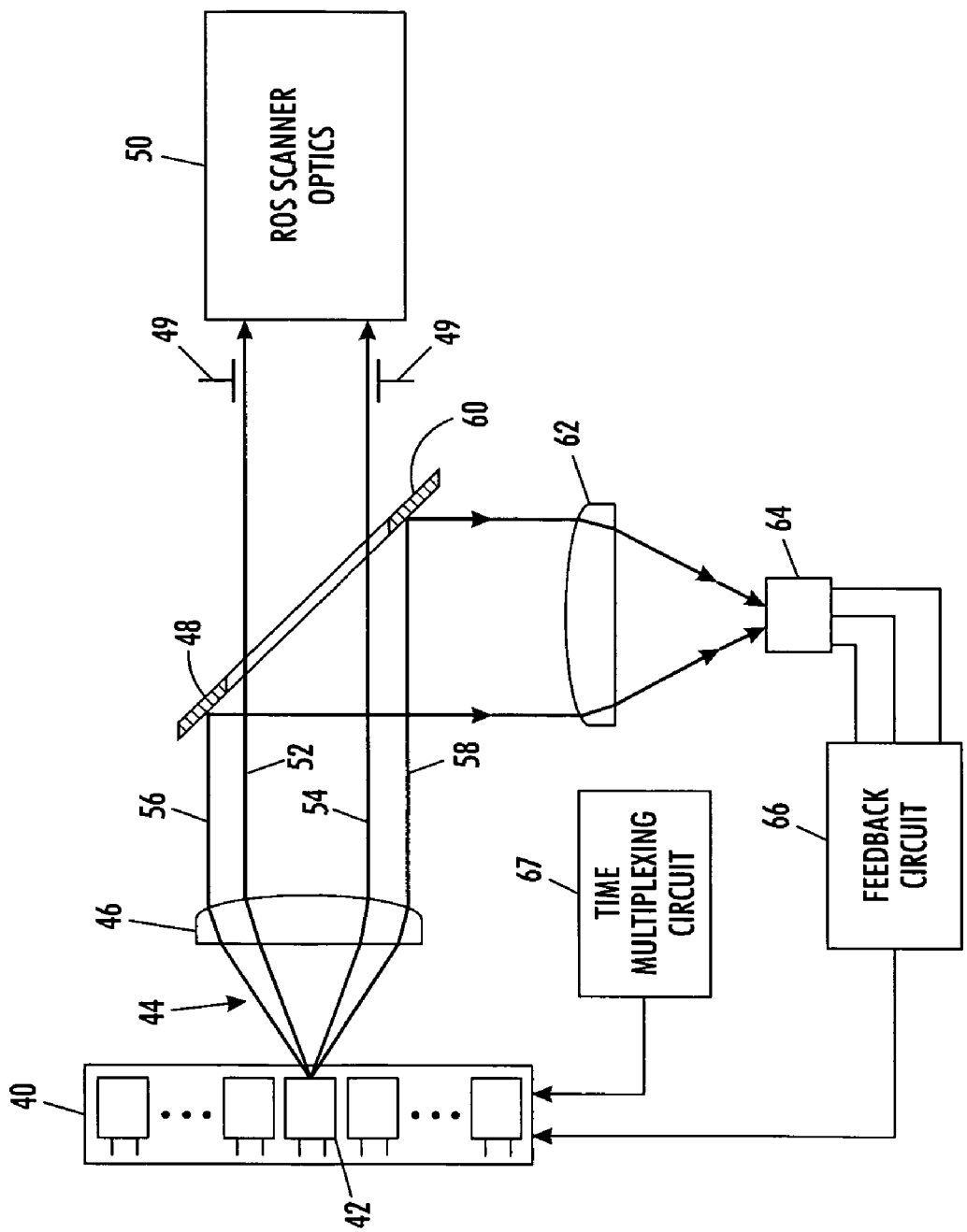
FIG. 1 is a schematic view of a raster scanning system which monitors the output power of laser diodes according to concepts of the present application.

With reference to FIG. 1, there is shown in schematic form a raster scanning system of this application which is capable of monitoring the output power of individual VCSEL diodes. Included in the system, is a VCSEL diode array 40 having an array of VCSEL light sources 42. For the purpose of explaining the present application, however, explanation is provided with respect to only a single VCSEL light source 42, with the understanding the remaining VCSEL light sources are similarly controlled. The VCSEL array 40 is not limited with respect to shape or arrangement of diodes. In an exemplary embodiment, VCSEL array 40 includes 32 individual VCSEL light sources.

Upon receiving a driving current at its input terminals, the VCSEL light source 42 emits a light beam 44 which is collimated by collimating lens 46. Raster scanning systems typically include a limiting aperture to further define the beam 44 for use by the ROS scanner optics. For example, a limiting aperture may be used to assist in defining the spot size in a xerographic system. In the embodiment shown, an aperture 48 is shown for the purpose of clipping fringe rays, however, the aperture 48 may or may not be the limiting aperture. A limiting aperture 49 may be optionally included for the purpose of defining the beam for the remaining parts of the system, e.g., spot size. The ROS scanner optics 50, therefore, receive a portion of the beam 44 defined by the aperture 48. For instance, the central light rays 52, 54 proceed uninterrupted through an opening in the aperture 48 to the ROS scanner optics 50. On the other hand, fringe light rays 56, 58 are clipped by an opaque portion 60 of aperture 48. In typical prior art scanning systems, these fringe rays 56, 58 which are clipped by the aperture 48 would serve no further purpose. The present application, however, advantageously uses these otherwise unused interrupted fringe rays for monitoring the power output of the VCSEL light source 42. To this end, the surface of opaque portion 60 is sufficiently reflective whereby fringe light rays 56, 58 are reflected through a focusing lens 62 which reimages the fringe rays 56, 58 onto a monitoring detector 64. While a 90 degree reflecting angle is shown any angle can be used. Smaller angles may reduce the variability of polarization errors associated with multiple diode laser sources. The monitoring detector 64 may be any suitable type of photo-detector known in the art which generates an electrical signal depending on the intensity of light impinging on the detector. The opaque portion may be made reflective by forming the surface such that it has a mirrored surface or mirrors may be added to the surface. Additionally, the present embodiments will also be effective by use of other appropriate reflective surfaces.

Monitoring signals generated by monitoring detector 64 are sent to a feedback circuit 66 which is operatively coupled to the VCSEL diode array 40 for the purpose of adjusting and maintaining the beam 44 intensity at a predetermined level. Feedback circuits such as the feedback circuit 66 shown are known in the art and an exemplary feedback circuit is disclosed in the aforementioned U.S. Pat. No. 5,600,126.

Figure 2:
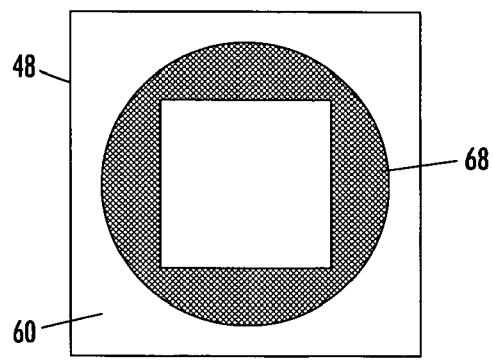
FIG. 2 is an axial view of an aperture used in the raster scanning system of FIG. 1.

With reference now to FIG. 2, an axial view of aperture 48 is shown. That is, a view as seen from the collimating lens 46 looking toward aperture 48. The opaque portion 60 is shown in the figure as having a square opening centered in the aperture 48, however, the present application is not limited to any particular aperture opening shape or size but rather is to be shaped or sized to reflect fringe rays 56, 58. A beam profile 68 is shown in the figure to illustrate how fringe light rays such as fringe rays 56, 58 impinge on opaque portion 60. Typically beam 44 from VCSEL diode light source 42 is essentially elliptical in cross-sectional shape, however, the application is not so restricted. The clipped portion of beam 44 striking opaque portion 60 of aperture 48 in beam profile area 68 may be used for monitoring the intensity or power output of VCSEL light source 42 without degrading or interacting in any negative way with the portion of the beam passing through aperture 48 opening to the ROS scanner optics.

Figure 3:
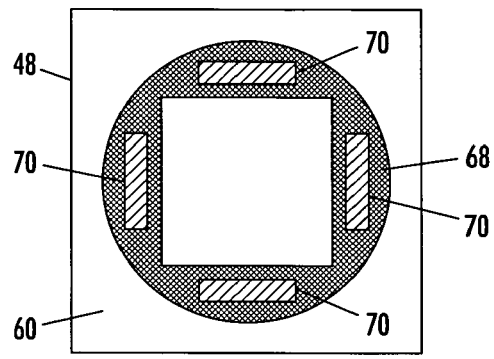
FIG. 3 is an axial view of an alternate aperture.

It is to be appreciated that, although the entire clipped portion of the beam 44 striking the opaque portion 60 may be used for monitoring the beam intensity, alternatively only a fraction of the clipped portion of the beam may be necessary to accomplish the monitoring task. Therefore, with reference now to FIG. 3, an aperture 48 is shown having reflective surfaces or mirrors 70 covering only a fraction of the opaque portion of the aperture 48. The reflective surfaces 70 are shown as a symmetrically arranged set of mirrors of rectangular shape, however, the application is not limited as to the number, size or shape of the reflective surfaces 70.

Figure 4:
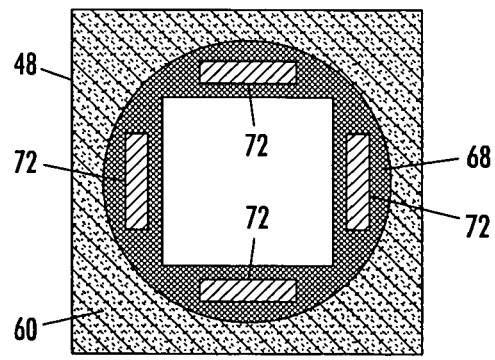
FIG. 4 is an axial view of second alternate aperture.
Figure 5:
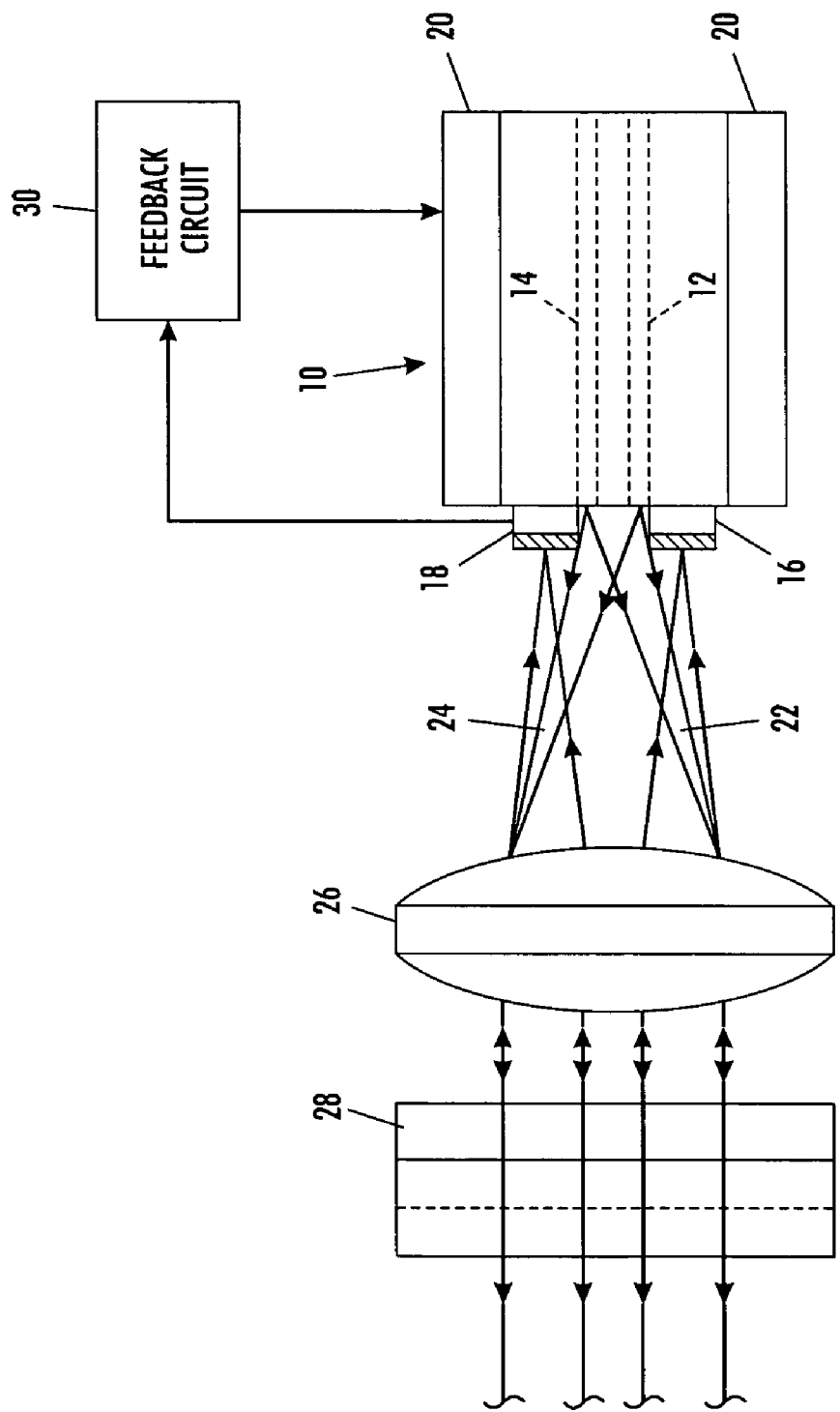
FIG. 5 is a prior art raster scanning system which monitors the output power of laser diodes.

With reference now to FIG. 4, an alternate embodiment of an aperture 48 is shown. In this embodiment, beam splitters 72 are used as reflective surfaces on the opaque portion 60 of the aperture. Alternately, the aperture 48 may comprise a single beam splitter having an absorptive coating covering the beam splitter except in selected reflective beam splitter areas 72. Of course, any number, size, shape, or type of reflective surfaces may be included on the aperture 48 and the present application is not limited in scope to any particular number, size, shape, or type of reflective surfaces.

The described embodiments sample the output power of the VCSEL diode 42 without reducing the power available to the ROS scanner optics 50. Preserving the optical power enables the system to use lower power rated and/or less expensive VCSEL diode lasers. The embodiment described utilizes a portion of the beam that is normally clipped by the aperture 48 and, in this way, power is not attenuated by a beam splitter or pickoff mirror located in the beam path.

Of course, the above described embodiment is obviously suitable for use with single diode light sources, however, the methods described are readily adaptable to systems having many diodes such as in the VCSEL diode array 40. For example, the sampled area of the clipped portion of the beam from each diode source in the array can be imaged onto a corresponding photodiode of an array of photodiodes. For instance, the multiple photodiodes may comprise a multiple-element array of photodiodes such as in a CCD array camera or similar type of device. Each diode laser may then be monitored independently at all times with each diode laser being sampled by its own corresponding detector or monitoring element. Appropriate selection of lenses 46, 62 allows for magnification or scaling of the imaged diode lasers onto the detectors or CCD array. Cylindrical lenses 62 may also be used to enable anamorphic scaling to match the photodiode array elements.

It is also possible to use a single detector for monitoring the power output of multiple VCSEL diodes or other types of diodes by utilizing time multiplexing. In this case, the light source diodes may be sampled sequentially during non-writing times where the sequential operation of the diodes has no adverse effect on the output of the ROS scanner optics. A time-multiplexing circuit 67 is shown in FIG. 1 which may be used to sequentially operate each of the diodes in the array 40 so that signals from the feedback circuit 66 may be used to individually monitor and adjust the output of each of the light-emitting diodes in the array 40.

Attention should also be given to the maintenance of the polarization of light beams throughout the system. Tilted, metal-coated mirrors have different polarized attenuation factors based on the input beam's polarization direction. That is, the reflective coating may be very efficient at one polarization angle but less efficient as the angle is varied. A complicating factor arises from the fact that many laser diodes, particularly VCSEL diodes, have various and often unpredictable degrees of polarization even among diodes on the same integrated circuit chip. This can, however, be accounted for in the design of the optical system, typically being accomplished by either forcing the sources to be of one polarization angle or by using an optical system that is polarization independent.

In order to accomplish the above, a non-polarizing beam splitter may be used as a polarization-maintaining mirror in place of the mirror 60 in the system and use part of the light 52, 54 to reflect to the detector 64. Non-polarizing beam splitters may only have minimized but significant polarization. They can vary with incident angle and from piece to piece. This polarization may influence the ability to control the individual diode lasers. Close attention should also be paid to errors associated with control of multiple diode lasers that can accumulate in the system. For example, when using a beam splitter, two potential optical power variability errors may arise. There can be an error in the transmitted part of the beam, and there can also be an error in the closed-loop part of the processing that is in the feedback circuit 66. These errors can be accounted for in calibration of the system. On the other hand, a pickoff mirror device as in this embodiment reduces the number of sources of error in that only the closed-loop feedback error occurs, and there is no transmission error. Minimizing the amount and number of sources of optical power variability between multiple diode lasers lessens the range on the calibration of the system.

Another complicating factor arises from various and unpredictable divergence and/or pointing angles among multiple diode laser sources. This can affect the amount of fringe light 56, 58 impinging on the reflective portions of the aperture and may contribute adversely to the variability of the feedback system in comparison with a monitoring system using a beam splitter.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A laser intensity monitoring and control apparatus comprising:
   at least one laser diode having a current input for receiving a drive current, the laser diode emitting laser light at an intensity that depends upon the drive current;
   at least one aperture for clipping portions of the laser light striking the aperture outside the predetermined beam contour of the laser light;
   at least one monitoring detector for sensing a reflected portion of the clipped laser light, the aperture reflecting the reflected portion in the direction of the monitoring detector, the monitoring detector generating an electrical signal depending on the intensity of the reflected portion of the clipped laser light; and
   a feedback circuit for monitoring the electrical signal, the feedback circuit adjusting the drive current of at least one laser diode as necessary to maintain a predetermined laser light intensity.

2. The laser intensity monitoring and control apparatus of claim 1, further comprising:
   at least one collimating lens situated between the laser diode and the aperture for collimating the emitted laser light.

3. The laser intensity monitoring and control apparatus of claim 1, further comprising:
   at least one focusing lens situated between the aperture and the monitoring detector for focusing the reflected portion of the clipped laser light onto the monitoring detector.

4. The laser intensity monitoring and control apparatus of claim 1, further comprising:
   a ROS scanner optics system for receiving and imaging the beam.

5. The laser intensity monitoring and control apparatus of claim 1, wherein the laser diode comprises a VCSEL diode.

6. The laser intensity monitoring and control apparatus of claim 1, wherein the aperture comprises a mirror.

7. The laser intensity monitoring and control apparatus of claim 6, wherein the mirror is partially coated with a non-reflective coating.

8. The laser intensity monitoring and control apparatus of claim 1, wherein the aperture includes at least one reflective coating for reflecting at least a portion of the clipped laser light.

9. The laser intensity monitoring and control apparatus of claim 1, further comprising:
   a laser diode array, with at least one laser diode comprising one of the laser diodes in the array.

10. The laser intensity monitoring and control apparatus of claim 9, the monitoring detector comprising a plurality of photodetectors, each photodetector corresponding to one of the laser diodes in the array, the feedback circuit adjusting the drive current of each laser diode depending on the generated electrical signal of the corresponding photodetector.

11. The laser intensity monitoring and control apparatus of claim 9, the monitoring detector comprising a single photodetector.

12. The laser intensity monitoring and control apparatus of claim 11, further comprising:
  a time multiplexing circuit, the time multiplexing circuit providing a test drive current to each laser diode in the array of diodes in timed succession during non-writing times, the feedback circuit adjusting the drive current levels of each laser diode based on the generated electrical signal received from the monitoring detector corresponding to each laser diode.

13. A raster output scanning system comprising:
  at least one laser diode having a current input for receiving a drive current, the laser diode emitting laser light at an intensity that depends upon the drive current;
  at least one collimating lens for collimating the emitted laser light;
  at least one aperture for clipping portions of the collimated laser light striking the aperture outside the predetermined beam contour of the laser light, the aperture further reflecting at least a portion of the clipped portion of the collimated laser light;
  at least one focusing lens for focusing the reflected portion of the clipped laser light;
  at least one monitoring detector for sensing the focused laser light, the monitoring detector generating an electrical signal depending on the intensity of the focused laser light;
  a feedback circuit for monitoring the electrical signal, the feedback circuit adjusting the drive current of at least one laser diode as necessary to maintain a predetermined laser light intensity; and
  a ROS scanner optics system for receiving and imaging the beam.

14. The raster output scanning system of claim 13, further comprising:
  a limiting aperture for defining the beam contour received by the ROS scanner optics system.

15. The raster output scanning system of claim 13 wherein the laser diode comprises a VCSEL diode.

16. The raster output scanning system of claim 13, further comprising:
  a laser diode array, with at least one laser diode comprising one of the laser diodes in the array.

17. The raster output scanning system of claim 16, the monitoring detector comprising a plurality of photodetectors, each photodetector corresponding to one of the laser diodes in the array, the feedback circuit adjusting the drive current of each laser diode depending on the generated electrical signal of the corresponding photodetector.

18. The raster output scanning system of claim 16, further comprising:
  a time multiplexing circuit, the time multiplexing circuit providing a test drive current to each laser diode in the array of diodes in timed succession during non-writing times, the feedback circuit adjusting the drive current levels of each laser diode based on the generated electrical signal received from the monitoring detector corresponding to each laser diode, the monitoring detector comprising a single photodetector.

19. The raster output scanning system of claim 16, wherein the raster output scanning system comprises a xerographic system.

20. A method for monitoring and controlling laser intensity in a ROS scanning system, the method comprising:
  emitting laser light from at least one laser diode at an intensity that depends upon a drive current supplied to the laser diode;
  clipping portions of the laser light striking the aperture outside the predetermined beam contour of the laser light;
  sensing a reflected portion of the clipped laser light with a monitoring detector, the aperture reflecting the reflected portion in the direction of the monitoring detector, the monitoring detector generating an electrical signal depending on the intensity of the reflected portion of the clipped laser light; and
  adjusting the drive current of at least one laser diode based on the generated electrical signal received by a feedback circuit to maintain a predetermined laser light intensity.

21. The method of claim 20, further comprising:
  collimating the emitted laser light with a collimating lens before being clipped by the aperture; and
  focusing the reflected portion of the clipped laser light with a focusing lens onto the monitoring detector.

* * * * *